United States Patent
Ieki (10) Patent No.: US 10,480,669 B2
(45) Date of Patent: Nov. 19, 2019

(54) VALVE DEVICE AND VALVE CONTROL DEVICE

(71) Applicant: HORIBA STEC, Co., Ltd., Kyoto-shi, Kyoto (JP)

(72) Inventor: Atsushi Ieki, Kyoto (JP)

(73) Assignee: HORIBA STEC, Co., Ltd., Kyoto-shi, Kyoto (JP)

( * ) Notice: Subject to any disclaimer, the term of this patent is extended or adjusted under 35 U.S.C. 154(b) by 0 days.

(21) Appl. No.: 15/827,423

(22) Filed: Nov. 30, 2017

(65) Prior Publication Data

US 2018/0163883 A1 Jun. 14, 2018

(30) Foreign Application Priority Data

Dec. 13, 2016 (JP) .................................. 2016-241086

(51) Int. Cl.
| | |
|---|---|
| *F16K 25/00* | (2006.01) |
| *F16K 31/00* | (2006.01) |
| *G05D 15/01* | (2006.01) |

(52) U.S. Cl.
CPC .......... *F16K 25/005* (2013.01); *F16K 31/007* (2013.01); *G05D 15/01* (2013.01)

(58) Field of Classification Search
CPC .................................. F16K 31/02; F16K 31/06
See application file for complete search history.

(56) References Cited

U.S. PATENT DOCUMENTS

| | | | | | |
|---|---|---|---|---|---|
| 2,641,278 | A | * | 6/1953 | Eplett | ................ F16K 17/0433 137/542 |
| 3,914,952 | A | * | 10/1975 | Barbier | ................ F25B 41/043 62/197 |
| 6,333,586 | B1 | * | 12/2001 | Polach | ................ F02M 47/027 310/328 |
| 7,554,243 | B2 | * | 6/2009 | Ollila | ..................... H02N 2/001 310/317 |
| 7,701,115 | B2 | * | 4/2010 | Higashionji | ........... H02N 2/004 310/315 |
| 8,669,825 | B2 | * | 3/2014 | Terasawa | ............... H03L 1/022 310/315 |
| 8,960,644 | B2 | * | 2/2015 | Aoyama | ................ F16K 1/425 251/331 |

(Continued)

FOREIGN PATENT DOCUMENTS

JP 2008196596 A 8/2008

*Primary Examiner* — Craig M Schneider
*Assistant Examiner* — Angelisa L. Hicks
(74) *Attorney, Agent, or Firm* — Alleman Hall Creasman & Tuttle LLP (57) ABSTRACT

In order to suppress changes in opening level and flow rate associated with the thermal expansion of a resin member caused by a temperature change, a valve device that displaces a valve body by applying drive voltage to an actuator is adapted to include: a position sensor that detects the position of the valve body; a voltage regulator that regulates the drive voltage on the basis of a detected position by the position sensor; and a temperature sensor that detects the temperature of the valve body. In addition, the seating surface of the valve body is adapted to be formed of a resin member, and the voltage regulator is adapted to change the setting value of the drive voltage depending on detected temperature by the temperature sensor.

4 Claims, 6 Drawing Sheets

(56) References Cited

U.S. PATENT DOCUMENTS

| | | | |
|---|---|---|---|
| 2006/0214538 A1* | 9/2006 | Okuda | B41J 2/04563 310/315 |
| 2007/0240769 A1* | 10/2007 | Suzuki | G05D 7/0635 137/487.5 |
| 2013/0048890 A1* | 2/2013 | Miura | F16K 17/196 251/129.01 |
| 2014/0070128 A1* | 3/2014 | Hayashi | F16K 25/005 251/359 |

* cited by examiner

VALVE DEVICE AND VALVE CONTROL DEVICE

TECHNICAL FIELD

The present invention relates to a valve device adapted to displace a valve body by an actuator, and to a valve control device adapted to control drive voltage to be applied to the actuator.

BACKGROUND ART

As a valve device, there is one adapted to include a valve body provided contactably with and separably from a valve seat, and an actuator that displaces the valve body, such as a piezo element, and control a valve opening level by controlling drive voltage to be applied to the actuator.

Figure 4:
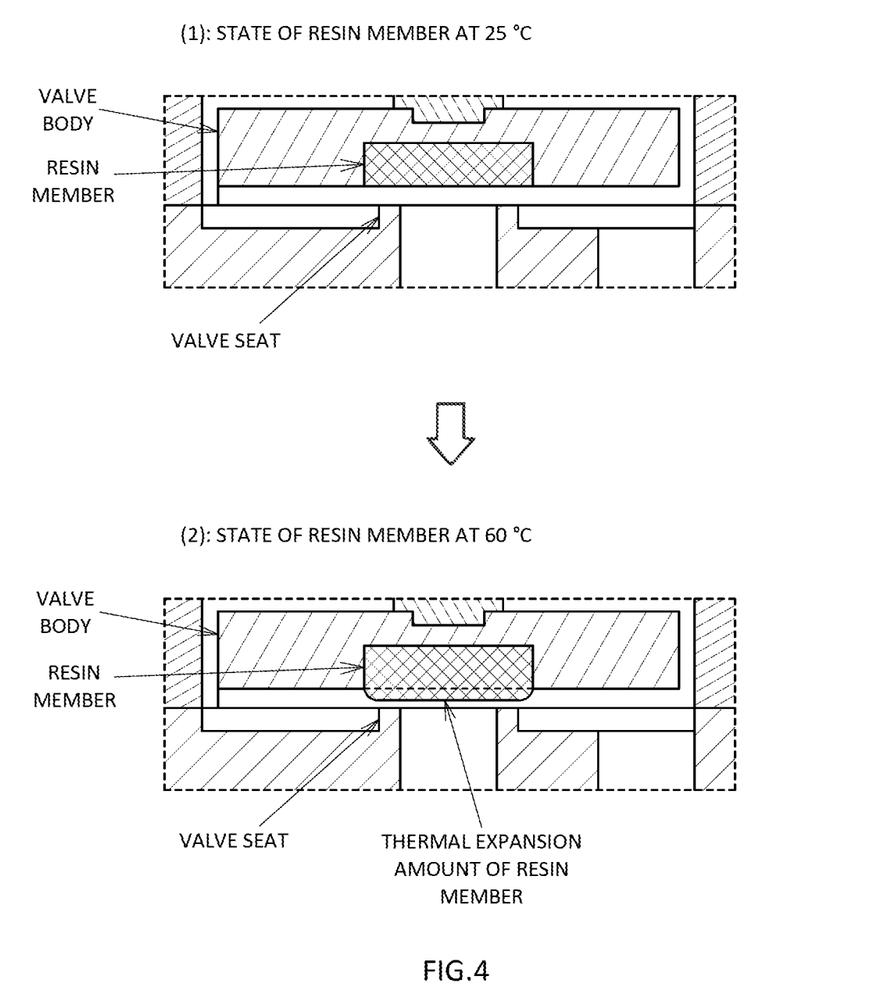
FIG. 4 is a schematic diagram illustrating how a resin member provided on a conventional valve body expands.
Figure 5:
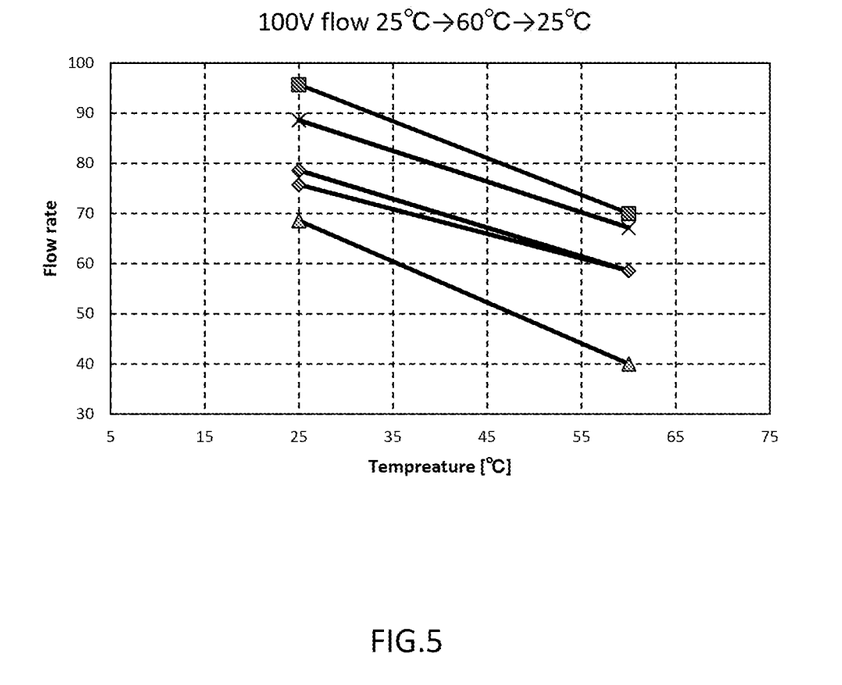
FIG. 5 is a graph illustrating a change in flow rate associated with a temperature change in a conventional valve device.

In recent years, in order to improve the closing performance of a valve device, there has been proposed a valve device configured to include a resin member on the seating surface of a valve body. However, in this configuration, under a high temperature environment, the resin member expands toward a valve seat side, and a reduction in flow rate is likely to increase (see FIG. 4). FIG. 5 illustrates a change in flow rate observed when the surrounding temperature of the valve body was changed from 25° C.→60° C.→25° C. in the configuration adapted to include the resin member on the seating surface of the valve body. Note that FIG. 5 illustrates the results of testing four types of valves. It turns out from FIG. 5 that at 25° C., a variation in flow rate is small, and good reproducibility of a flow rate is obtained. In addition, applied voltage to each piezo element as an actuator was 100 V, and the gauge pressure of fluid supplied to each valve was 50 kPa. As can be seen from FIG. 5, the phenomenon that even when the same drive voltage was applied as that in the 25° C. environment, a flow rate reduced under the 60° C. environment was observed.

Note that in a conventional valve device, the upper limit value of an operable range of drive voltage to be applied to an actuator is fixed in many cases. In order to flow fluid at a full scale flow rate within an operable temperature range (e.g., 25° C. to 60° C.), the upper limit value of the operation range is set to a value obtaining by adding a margin for allowing individual differences to drive voltage for flowing the fluid at the full scale flow rate under a reference temperature (e.g., 25° C.) environment. Note that the full scale flow rate refers to the maximum flow rate at which the fluid can be flowed through a mass flow controller configured to incorporate the valve device, and also refers to a flow rate lower than a flow rate at which the fluid can be flowed when the valve device is in a fully open state.

As for the upper limit value of the operable range, it is conceivable that a value including a margin for allowing thermal expansion of a valve body occurring when the valve device is used in the above-described high temperature (e.g., 60° C.) environment is set as the upper limit value.

Figure 6:
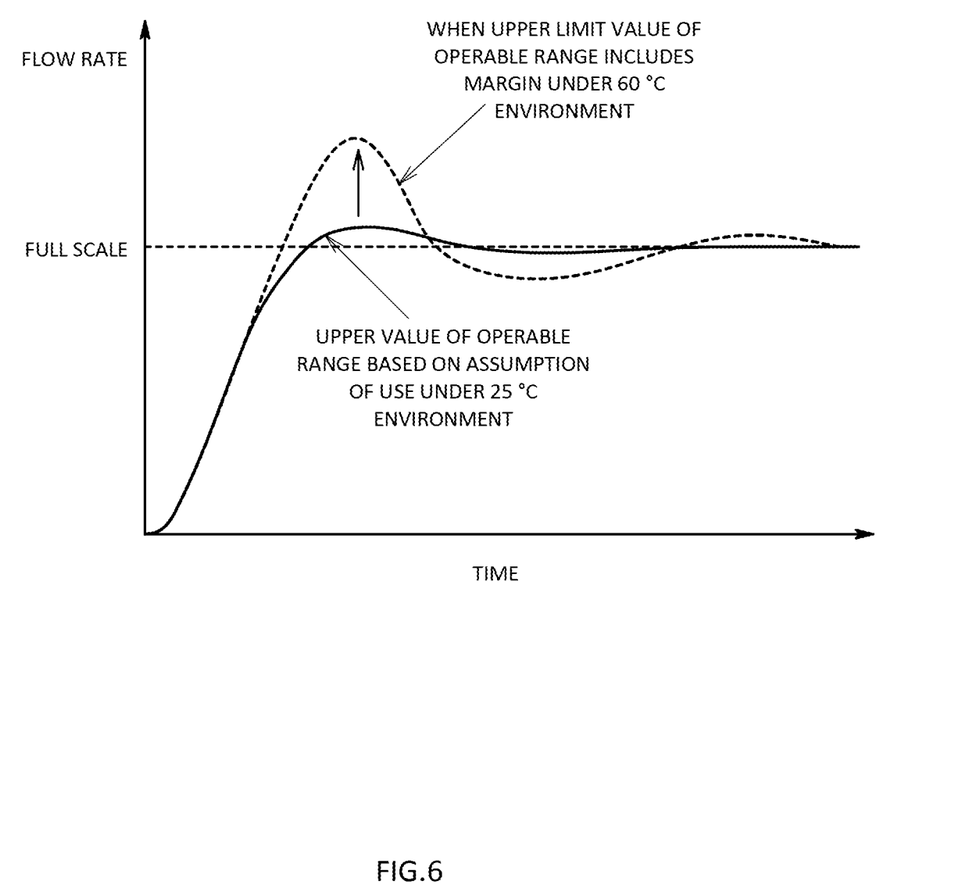
FIG. 6 is a schematic diagram illustrating overshoot observed when an upper limit level allowing thermal expansion under a high temperature environment is set in a conventional manner.

However, when the upper limit value of the operable range is the value allowing the thermal expansion under the high temperature (e.g., 60° C.) environment, controlling at the full scale flow rate under a normal temperature (e.g., 25° C.) environment results in an increase in overshoot caused by a transient response, thus deteriorating responsiveness (see FIG. 6). In addition, there is also a problem that the control accuracy (resolution) of flow rate control at normal temperature deteriorates.

CITATION LIST

Patent Literature

Patent Literature 1: Japanese Unexamined Patent Publication JP-A 2008-196596

SUMMARY OF INVENTION

Technical Problem

Therefore, the present invention is made in order to solve the above-described problems, and a main object thereof is to suppress changes in opening level and flow rate associated with the thermal expansion of a resin member caused by a temperature change.

Solution to Problem

That is, a valve device according to the present invention is one adapted to displace a valve body by applying drive voltage to an actuator, and the valve device includes: a position sensor that detects the position of the valve body; a voltage regulator that regulates the drive voltage on the basis of a detected position by the position sensor; and a temperature sensor that detects the temperature of or around the valve body. In addition, the seating surface of the valve body is formed of a resin member, and depending on detected temperature by the temperature sensor, the voltage regulator changes the setting value of the drive voltage.

Also, a valve control device according to the present invention is one adapted to control drive voltage for an actuator that drives a valve body whose seating surface is formed of a resin member, and the valve control device includes: a positional information acquisition part that acquires positional information indicating the position of the valve body; a voltage regulator that regulates the drive voltage on the basis of a detected position by a position sensor; and a temperature information acquisition part that acquires temperature information indicating the temperature of or around the valve body. In addition, depending on the temperature information acquired by the temperature information acquisition part, the voltage regulator changes the setting value of the drive voltage.

Since the valve device and valve control device are such that depending on the detected temperature by the temperature sensor, the voltage regulator that regulates the drive voltage on the basis of the detected position by the position sensor changes the setting value of the drive voltage to be applied to the actuator to a setting value corresponding to each temperature, responsiveness and control accuracy can be prevented from deteriorating. Accordingly, a change in flow rate associated with the thermal expansion of the resin member caused by a temperature change can be suppressed. Also, the voltage regulator is one adapted to regulate the drive voltage on the basis of the detected position by the position sensor, and therefore as compared with the case of flow rate control using a flow rate by a flow rate sensor, responsiveness can be improved.

In addition, when a flow rate sensor provided on the upstream or downstream side of a valve device detects a flow rate, and the opening level of the valve device is controlled with the detected flow rate set as a target value, the following problem exists. That is, due to the creep phenomenon of a valve body, the temporal change of the valve body, or other causes, a position where the valve body separates from a valve seat and thereby fluid starts to flow (a flow start position) changes depending on the number of valve drive times, and consequently a flow rate obtained corresponding to drive voltage changes depending on the number of drive times. For this reason, the flow rate control using the flow rate by the flow rate sensor causes a deterioration in responsiveness.

Specifically, it is preferable that the voltage regulator is one adapted to regulate the drive voltage within a predetermined operable range, and depending on the detected temperature by the temperature sensor, changes the upper limit value of the operable range.

In order to grasp a resin member expansion amount or an opening level reduction amount associated with the resin member expansion amount to thereby accurately correct the effect of the amount, it is preferable that the valve device further includes an expansion-related information storage part that stores expansion-related information indicating an resin member expansion amount at each temperature or an opening level reduction amount associated with the resin member expansion amount, and the voltage regulator changes the upper limit value of the operable range on the basis of the resin member expansion amount or the opening level reduction amount obtainable from the detected temperature and the expansion-related information.

In order to suitably correct the effect of the thermal expansion of the resin member in the flow rate control using the position sensor, it is preferable that the voltage regulator regulates the drive voltage on the basis of the resin member expansion amount or the opening level reduction amount obtainable from the detected temperature by the temperature sensor and the expansion-related information, and the detected position by the position sensor.

Advantageous Effects of Invention

According to the present invention, since the depending on the detected temperature by the temperature sensor, the voltage regulator changes the upper limit value of the operable range of the drive voltage to be applied to the actuator, changes in opening level and flow rate associated with the thermal expansion of the valve body caused by a temperature change can be suppressed.

DESCRIPTION OF EMBODIMENTS

In the following, one embodiment of a valve device according to the present invention will be described with reference to drawings.

A valve device 100 of the present embodiment is one used for, for example, a semiconductor manufacturing process, and constituting a mass flow controller adapted to control the flow rate of fluid flowing through a flow path.

Figure 1:
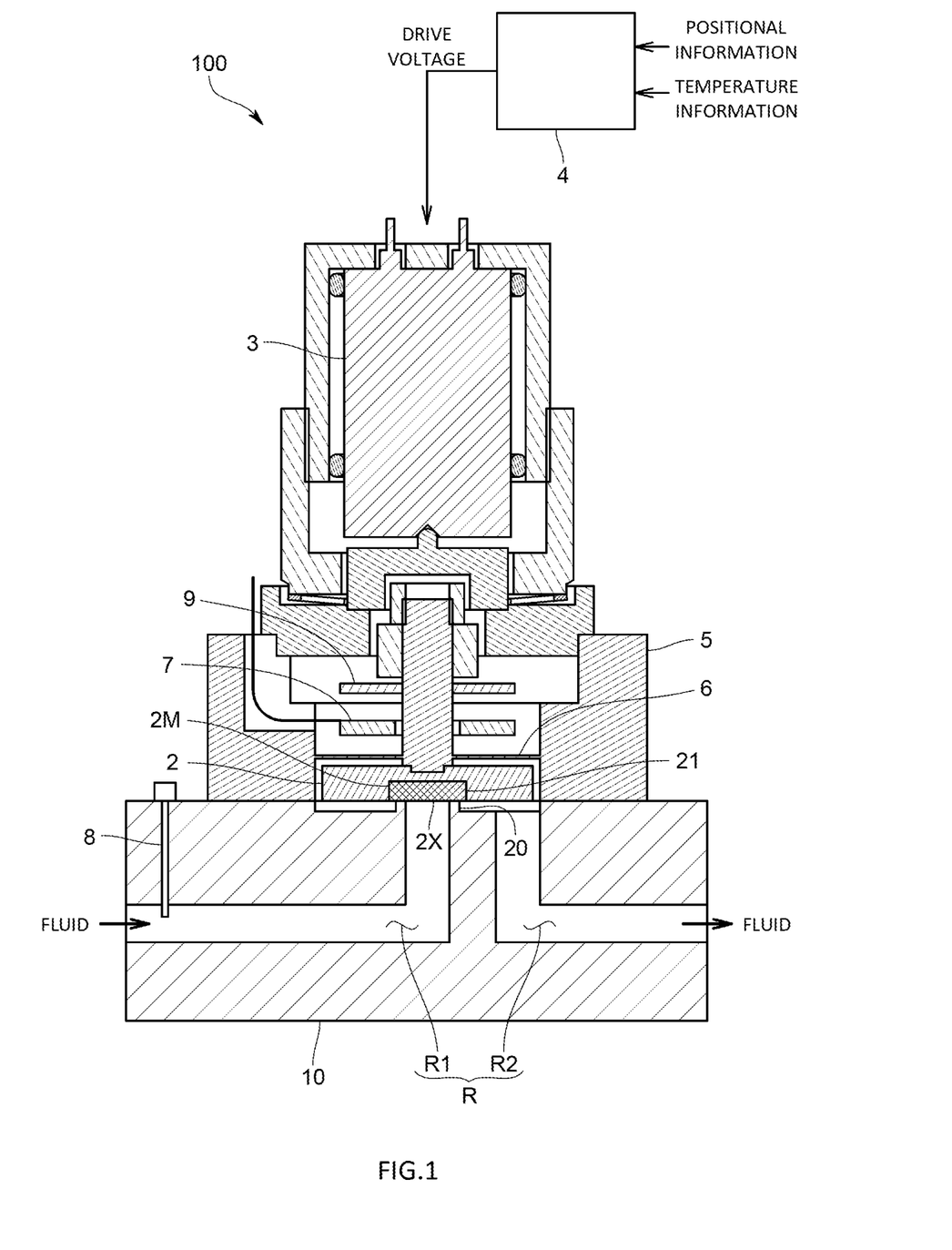
FIG. 1 is a cross-sectional view schematically illustrating the configuration of a valve device of the present embodiment.

Specifically, as illustrated in FIG. 1, the valve device 100 is one adapted to control the flow rate of fluid flowing through a flow path R, and includes: a valve body 2 provided contactably with and separably from a valve seat 20; an actuator 3 for displacing the valve body 2 with respect to the valve seat 20; and a control device 4 for controlling drive voltage to be applied to the actuator 3.

In the present embodiment, the flow path R is formed inside a block body 10, and opens in one surface of the block body 10 in the middle thereof. This opening divides the flow path R into an upstream side flow path R1 and a downstream side flow path R2, and the valve seat 20 is formed around the opening. In addition, the valve device 100 is attached so as to cover the opening and the valve seat 20.

The valve body 2 is provided, via a diaphragm 6, integrally with the main body part 5 attached to the block body 10. A seating surface 2X of the valve body 2 is formed of a resin member 21. The resin member 21 is provided in a concave part 2M formed in the main body of the valve body 2.

Also, in an internal space of the main body part 5, a position sensor 7 that detects the relative position of the valve body 2 to the valve seat 20 is provided. The position sensor 7 is provided on a static side including the main body part 5 and the like, and detects a relative distance from the valve body 2 or a member movable together with the valve body 2. The position sensor 7 in the present embodiment is an eddy current sensor, and measures a distance from an electrically conductive target 9 movable together with the valve body 2.

The actuator 3 is one adapted to drive the valve body 2 to set a valve opening level, i.e., to set the separation distance between the valve seat 20 and the valve body 2. The actuator 3 is, for example, a piezo stack formed by stacking multiple piezo elements, and the displacement thereof is controlled by the drive voltage to be applied. In the present embodiment, the actuator 3 is configured to, by being applied with the drive voltage, extend to thereby separate the valve body 2 from the valve seat 20 (i.e., configured as a normally close type). In addition, the valve body 2 separates from the valve seat 20, and thereby the upstream side flow path R1 and the downstream side flow path R2 are communicatively connected to each other.

The control device 4 is one adapted to acquire positional information (position detected signal) from the position sensor 7, and control the position of the valve body 2 to thereby control the valve opening level. Note that the control device 4 is a so-called computer including a CPU, a memory, an input/output interface, and the like.

Figure 3:
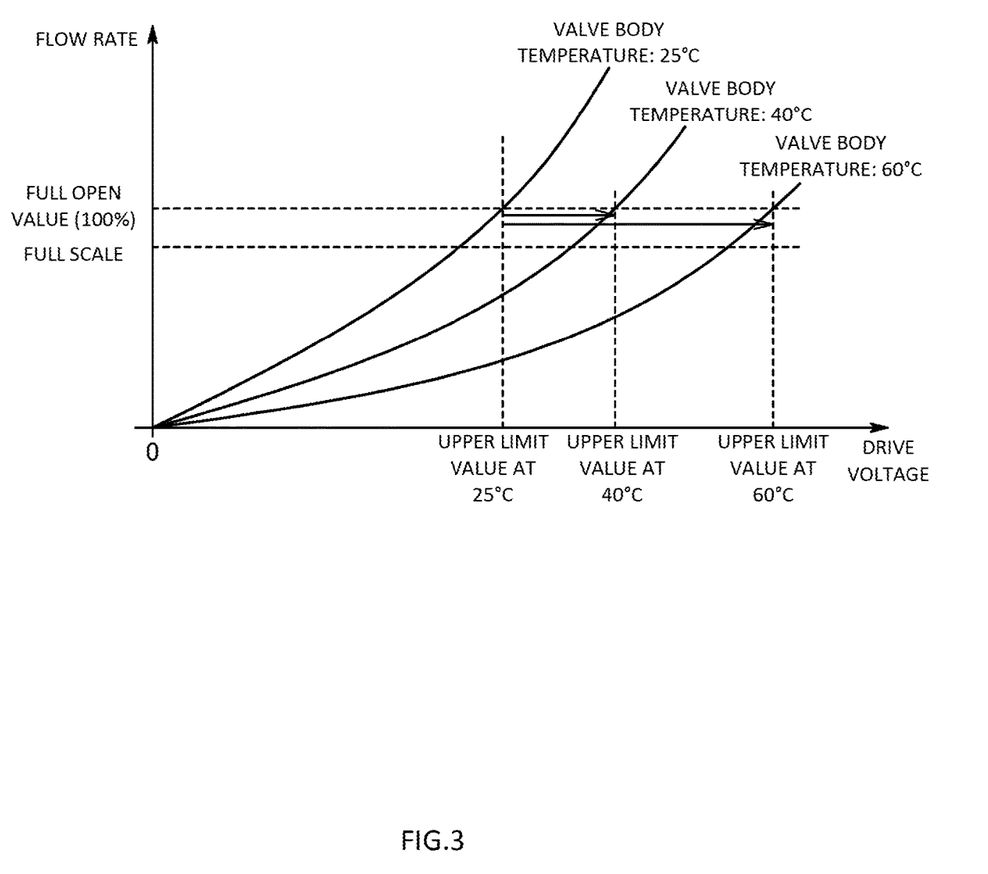
FIG. 3 is a schematic diagram illustrating the upper limit values of drive voltage and changes in flow rate at 25° C., 40° C., and 60° C.

In addition, the execution of a control program stored in the memory allows the respective parts of the control device 4 to cooperate, and thereby as illustrated in FIG. 3, the control device 4 fulfills functions at least as a temperature information acquisition part 41, positional information acquisition part 42, expansion-related information storage part 43, and voltage regulator 44.

Figure 2:
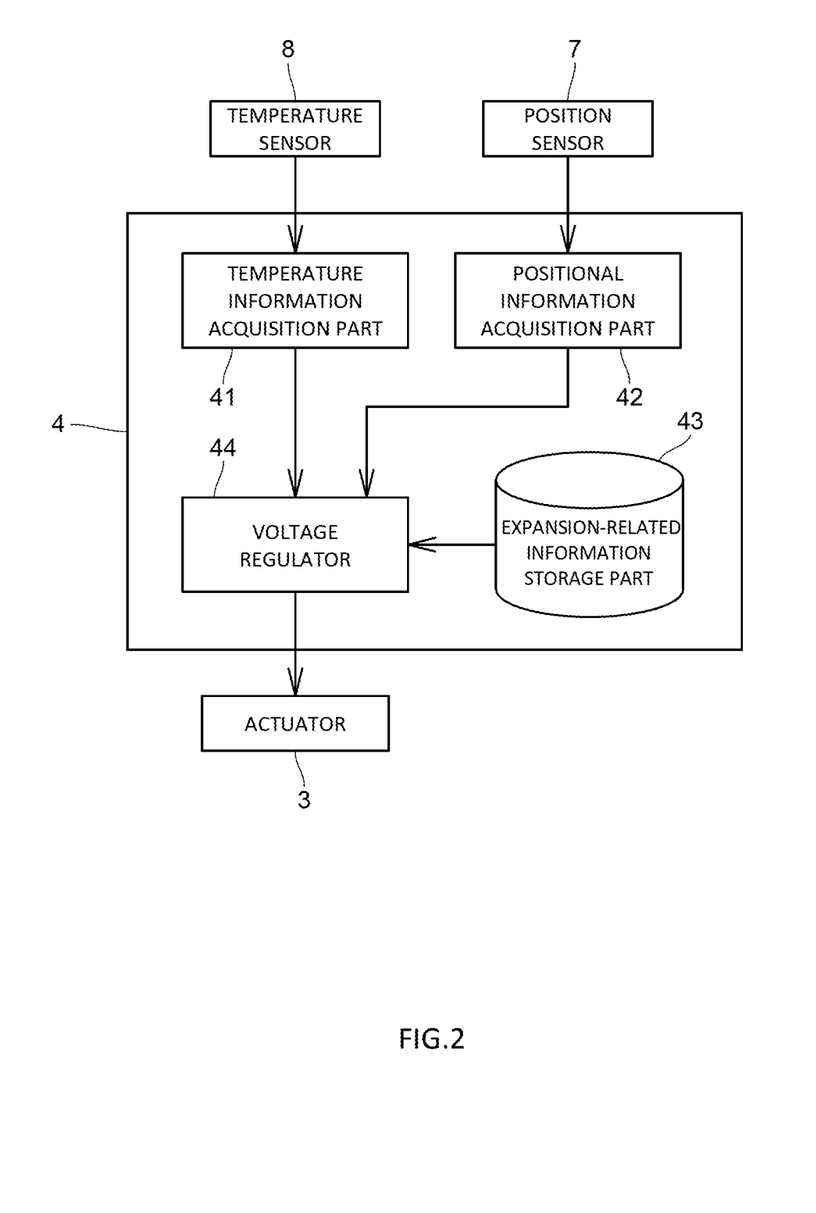
FIG. 2 is a diagram illustrating the functional configuration of a valve control device of the same embodiment.

The temperature information acquisition part 41 is one adapted to acquire temperature information (temperature detection signal) indicating detected temperature by a temperature sensor 8 that detects the temperature of the valve body 2 or temperature around the valve body 2.

Note that the temperature around the valve body 2 refers to the temperature of a part, which reaches substantially the same temperature as that of the valve body 2 (specifically, the resin member 21). For example, the temperature around the valve body 2 refers to the temperature of the block body 10 near the resin member 21 or of the main body part 5, the temperature of the fluid flowing through the flow path R, or the temperature of a part of the block body 10, which reaches substantially the same temperature as that of the fluid. Note that in FIG. 1, the temperature sensor 8 is provided at a position to detect the temperature of the fluid.

The positional information acquisition part 42 is one adapted to acquire the positional information (position detected signal) indicating the position of the valve body from the position sensor 7.

The expansion-related information storage part 43 is one adapted to store expansion-related information indicating a resin member 21 expansion amount at each temperature or an opening level reduction amount associated with the resin member expansion amount. Note that the expansion-related information is obtained for each valve device 100 and preliminarily inputted.

The resin member 21 expansion amount is the amount of expansion of the resin member 21 at each temperature with, for example, a state of the resin member 21 at normal temperature (e.g., 25° C.) as a reference. Also, the opening level reduction amount is the amount of reduction in opening level at each temperature caused by the amount of expansion of the resin member 21 at each temperature.

The voltage regulator 44 is one adapted to, within a predetermined operable range, regulate the drive voltage to be applied to the actuator 3 in order to control the position of the valve body 2. The voltage regulator 44 in the present embodiment is one adapted to change the upper limit value of the operable range depending on the detected temperature by the temperature sensor 8.

Specifically, the voltage regulator 44 changes the upper limit value of the operable range on the basis of the resin member 21 expansion amount or the opening level reduction amount obtainable from the detected temperature by the temperature sensor 8 and the expansion-related information.

For example, the upper limit value of the operable range of the drive voltage when the temperature of or around the valve body 2 is 25° C., 40° C., or 60° C. is as illustrated in FIG. 3. FIG. 3 illustrates the case where the upper limit value of the operable range is changed stepwise along with a change in setting temperature (three setting temperatures of 25° C., 40° C., and 60° C.); however, the upper limit value of the operable range may be adapted to be changed continuously.

In the case where the upper limit value of the operable range is changed stepwise, the upper limit value of the operable range at 25° C. can be set to a value obtained by adding a margin for allowing, for example, the thermal expansion of the resin member 21 at 30° C. or the like to the drive voltage for flowing the fluid at a full scale flow rate under a 25° C. environment. Also, the upper limit value of the operable range at 40° C. can be set to a value obtained by adding a margin for allowing, for example, the thermal expansion of the resin member 21 at 50° C. or the like to the drive voltage for flowing the fluid at the full scale flow rate under a 40° C. environment. Further, the upper limit value of the operable range at 60° C. can be set to a value obtained by adding a margin for allowing, for example, the thermal expansion of the resin member 21 at 65° C. or the like to the drive voltage for flowing the fluid at the full scale flow rate under a 60° C. environment.

In this case, when the detected temperature by the temperature sensor 8 is equal to or more than a predetermined setting temperature (e.g., 25° C.), and equal to or less than the maximum temperature (e.g., 30° C.) including a margin for the predetermined setting temperature, the voltage regulator 44 regulates the drive voltage on the basis of the upper limit value of the operable range at the predetermined setting temperature (e.g., 25° C.). On the other hand, when the detected temperature is larger than the maximum temperature (e.g., 30° C.) including the margin for the predetermined setting temperature, the voltage regulator 44 changes the upper limit value of the operable range to that at setting temperature (40° C.) higher by one level than the predetermined setting temperature (25° C.), and on the basis of the changed upper limit value of the operable range, regulates the drive voltage.

Further, the voltage regulator 44 regulates the drive voltage on the basis of the resin member 21 expansion amount or the opening level reduction amount obtainable from the detected temperature by the temperature sensor 8 and the expansion-related information, and the detected position by the position sensor 7. The voltage regulator 44 regulates the drive voltage to be applied to the actuator 3 as described, and thereby the flow rate can be controlled while correcting a reduction in opening level caused by the thermal expansion of the resin member 21.

Since the valve device 100 configured as described above is such that depending on the detected temperature by the temperature sensor 8, the voltage regulator 44 changes the upper limit value of the operable range of the drive voltage to be applied to the actuator 3 to the upper limit value of the operable range corresponding to each temperature, responsiveness and control accuracy can be prevented from deteriorating. Accordingly, changes in opening level and flow rate associated with the thermal expansion of the resin member 21 caused by a temperature change can be suppressed.

Note that the present invention is not limited to the above-described embodiment.

For example, in the above-described embodiment, the configuration in which the valve seat 20 is provided on the block body 10 to be attached with the valve device 100 is described; however, the valve device 100 may be configured to include a valve seat. Specifically, in addition to the configuration of the above-described embodiment, the valve device 100 includes a flow path forming member (corresponding to the block body in the above-described embodiment) formed with an internal flow path and the valve seat.

Also, the above-described embodiment is one adapted to feedback control the flow rate using the detected position by the position sensor; but may be one adapted to feedback control the flow rate using, in addition to the detected position by the position sensor, a detected flow rate by a flow rate sensor.

For example, the position sensor 7 is not limited to the eddy current sensor in the above-described embodiment but may be a capacitance sensor, or an optical sensor such as an optical interference sensor. Alternatively, it may be adapted to sense the drive voltage for the actuator and thereby acquire the positional information.

Further, it may be adapted to store, in the memory, temperature-upper limit value information in which the temperature of the valve body and the upper limit value of the operable range at the temperature are related to each other, and on the basis of the detected temperature by the temperature sensor and the temperature-upper limit value information, change the upper limit value of the operable range.

In addition, in the above-described embodiment, the voltage regulator is one adapted to change the upper limit value of the operable range of the drive voltage depending on the detected temperature by the temperature sensor, but may be one adapted to change another setting value within the operable range. For example, the voltage regulator may be one adapted to, depending on the detected temperature by the temperature sensor, change the drive voltage for flowing the fluid at the full scale flow rate.

The above-described embodiment is of the normally close type (the valve is closed in a state where the drive voltage is not applied). However, even when the valve device is of a normally open type (the valve is opened in the state where the drive voltage is not applied), the same effect can be produced.

The valve device of the above-described embodiment is a flow rate control valve adapted to control the flow rate of the fluid, but may be configured to be a pressure control valve adapted to control the pressure of fluid.

The valve device of the above-described embodiment can also be used for purposes other than the semiconductor manufacturing process.

Besides, it goes without saying that the present invention is not limited to any of the above-described embodiment and variations, but can be various1y modified without departing from the scope thereof.

LIST OF REFERENCE CHARACTERS

100: Valve device
2: Valve body
2X: Seating surface
21: Resin member
3: Actuator
4: Valve control device (control device)
41: Temperature information acquisition part
42: Positional information acquisition part
43: Expansion-related information storage part
44: Voltage regulator
7: Position sensor
8: Temperature sensor

The invention claimed is:

1. A valve device, comprising:
a valve body configured to be displaced by application of drive voltage to an actuator, the valve body including a seating surface that is formed of a resin member;
a position sensor that detects a position of the valve body;
a voltage regulator that regulates the drive voltage within a predetermined operable range on a basis of a detected position by the position sensor; and
a temperature sensor that detects temperature of or around the valve body, wherein
as a detected temperature by the temperature sensor increases, the voltage regulator increases an upper limit value of the operable range.

2. The valve device according to claim 1, further comprising
an expansion-related information storage part that stores expansion-related information indicating a resin member expansion amount at each temperature or an opening level reduction amount associated with the resin member expansion amount, wherein
the voltage regulator changes the upper limit value of the operable range on a basis of the resin member expansion amount or the opening level reduction amount obtainable from the detected temperature and the expansion-related information.

3. The valve device according to claim 2, wherein
the voltage regulator regulates the drive voltage on a basis of the resin member expansion amount or the opening reduction amount obtainable from the detected temperature and the expansion-related information, and the detected position by the position sensor.

4. A valve control device adapted to control drive voltage for an actuator that drives a valve body including a seating surface that is formed of a resin member, the valve control device comprising:
a positional information acquisition part that acquires positional information indicating a position of the valve body;
a voltage regulator that regulates the drive voltage within a predetermined operable range on a basis of a detected position by a position sensor; and
a temperature information acquisition part that acquires temperature information indicating a temperature of or around the valve body, wherein
as the temperature indicated by the temperature information acquired by the temperature information acquisition part increases, the voltage regulator increases an upper limit value of the operable range.

* * * * *